UNITED STATES PATENT OFFICE.

ALBERT HESSE, OF LEIPSIC, GERMANY, ASSIGNOR TO HEINE & CO., OF SAME PLACE.

ARTIFICIAL OIL OF JASMIN.

SPECIFICATION forming part of Letters Patent No. 658,846, dated October 2, 1900.

Application filed February 5, 1900. Serial No. 4,107. (Specimens.)

*To all whom it may concern:*

Be it known that I, ALBERT HESSE, a subject of the German Emperor, residing at Leipsic, in the Kingdom of Saxony, Germany, have invented a certain new and useful Process for Manufacturing Artificial Oil of Jasmin, of which the following is a clear and exact specification.

The essential oil of the jasmin-flower (*Jasminum grandiflorum*,) which possesses the delicious odor of the jasmin-flower in a high degree, is very expensive, and consequently only capable of very restricted use. One kilogram of the oil corresponds to about one thousand kilograms of jasmin-flower and is produced at a cost of about seven hundred and fifty dollars.

According to my earlier researches the natural oil of jasmin contains the following compounds, which are obtainable in commerce at relatively-low prices, viz: benzyl-acetate, ($C_9H_{12}O_2$,) sixty-five per cent.; linalyl-acetate, ($C_{12}H_{20}O_2$,) 7.5 per cent.; benzyl-alcohol, ($C_7H_8O$,) six per cent., and linalool, ($C_{10}H_{18}O$,) 15.5 per cent. The mixture of these four principal constituents of the natural oil resembles the latter somewhat as regards its odor, but does not even approach the same as regards delicacy of perfume.

The present invention has for its object the manufacture of artificial oil of jasmin which may serve in perfumery as a good substitute for the natural oil, but is much cheaper than the same.

By means of recent experiments I have discovered that the mixture of benzyl-acetate, linalyl-acetate, benzyl-alcohol, and linalool may be immensely improved as regards the freshness and delicacy of its perfume by mixing with it small quantities of one or more of the following substances, viz: the methyl-ester of anthranilic acid, ($C_8H_9NO_2$,) indol, ($C_8H_7N$,) and jasmon, ($C_{11}H_{16}O$.) Of these three substances, which are all contained in the natural oil of jasmin, as I have found, the two first are already known. The jasmon, ($C_{11}H_{16}O$,) which has not hitherto been mentioned in the chemical literature, is a ketone which occurs in essential oils, and especially in the natural oil of jasmin, from which oils it may be separated by conversion into its oxim by means of hydroxylamin. At a pressure of seven hundred and fifty-five millimeters its boiling-point lies between 257° and 258° centigrade. Its specific gravity at 15° centigrade is 0.945. It is soluble in water and very easily in organic solvents, and has an exceedingly-pungent odor, which manifests itself especially also in dilute solutions and is then very agreeable. The jasmon-oxim melts at 45° centigrade.

By adding the three compounds mentioned above—viz., methyl-ester of anthranilic acid, indol, and jasmon—to a mixture of benzyl-acetate, linalyl-acetate, benzyl-alcohol, and linalool a composition may be obtained which has an extraordinary resemblance with the natural oil of jasmin and which cannot be distinguished from the same if the various constituents are mixed together in the following proportions, viz: jasmon, three per cent.; indol, 2.5 per cent.; methyl-ester of anthranilic acid, 0.5 per cent.; benzyl-acetate, sixty-five per cent.; linalyl-acetate, 7.5 per cent.; benzyl-alcohol, six per cent, and linalool, 15.5 per cent. The proportions of these ingredients may be varied, and only one or two of the compounds—methyl-ester of anthranilic acid, indol, and jasmon—may be added to the mixture of the four fundamental constituents mentioned above in order to obtain an artificial oil of jasmin whose odor approaches very closely that of the natural oil. Instead of indol one of its homologues—such as methyl-indol, skatol, &c.—may be employed without materially changing the result.

What I claim is—

1. A composition of matter consisting of benzyl-acetate, linalyl-acetate, benzyl-alcohol, linalool, and methyl-ester of anthranilic acid ($C_8H_9NO_2$), substantially as described and for the purpose specified.

2. A composition of matter consisting of a mixture of benzyl-acetate, linalyl-acetate, benzyl-alcohol, and linalool in the proportions described, and methyl-ester of anthranilic acid, and jasmon, ($C_{11}H_{16}O$,) substantially as and for the purpose described, jasmon being a liquid ketone of the composition ($C_{11}H_{16}O$,) derivable from natural oil of jasmin and soluble in water, its boiling-point at a pressure of seven hundred and fifty-five millimeters lying between 257° and 258° centigrade, and its specific gravity at 15° centigrade being 0.945.

3. A composition of matter consisting of benzyl-acetate, linalyl-acetate, benzyl-alcohol, linalool, methyl-ester of anthranilic acid, jasmon and indol ($C_8H_7N$), substantially as and for the purpose specified.

4. A composition of matter consisting of benzyl-acetate, linalyl-acetate, benzyl-alcohol, linalool, and jasmon, as and for the purpose specified.

5. A composition of matter consisting of benzyl-acetate, linalyl-acetate, benzyl-alcohol, linalool, jasmon and indol, substantially as and for the purpose specified.

6. A composition of matter consisting of benzyl-acetate, linalyl-acetate, benzyl-alcohol, linalool, methyl-ester of anthranilic acid, and indol, substantially as and for the purpose specified.

In witness whereof I have hereunto set my hand in the presence of two subscribing witnesses.

ALBERT HESSE.

Witnesses:
HANS STICHE,
RUDOLPH FRICKE.